Dec. 31, 1929.  E. H. HENDRICKS  1,741,460
MOTOR
Filed April 12, 1927  3 Sheets-Sheet 1

Elfonso Haynes Hendricks
INVENTOR
BY Victor J. Evans
ATTORNEY

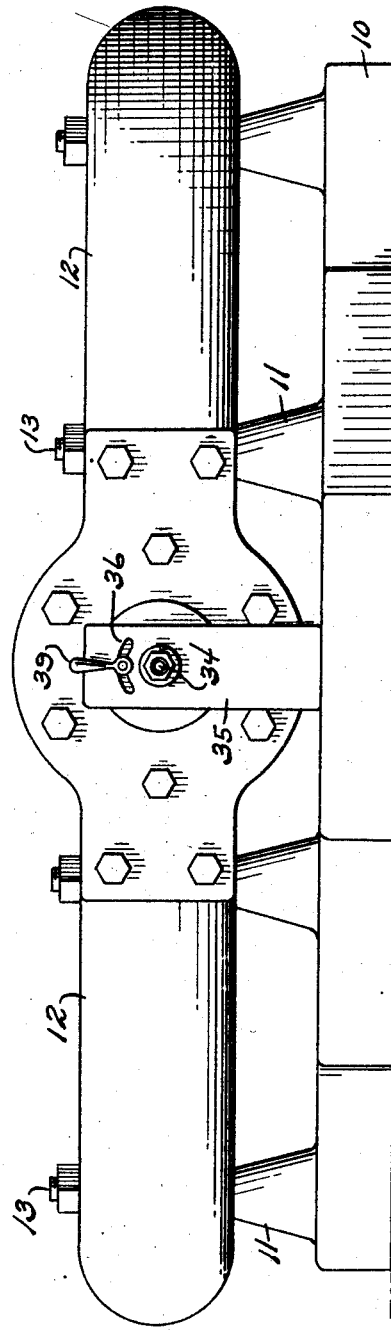
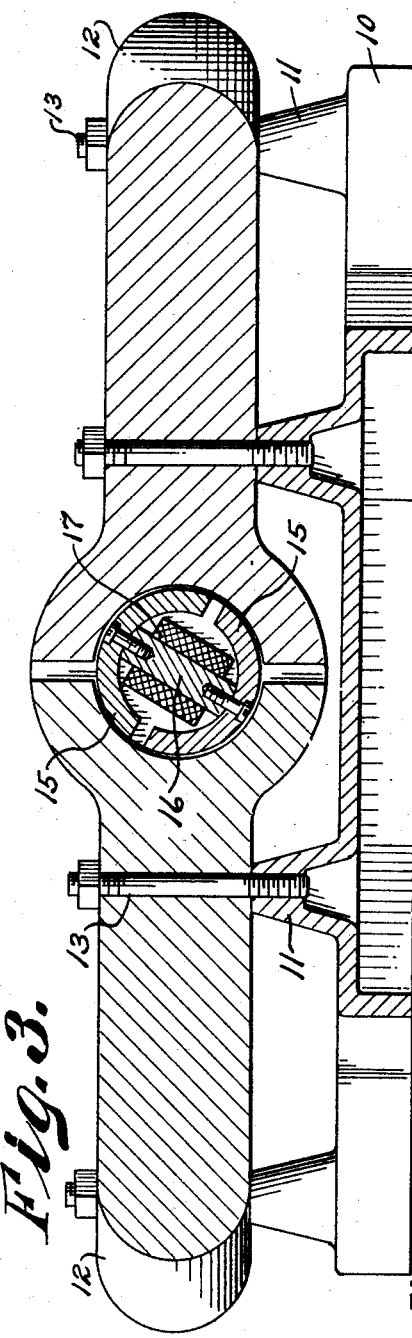

Dec. 31, 1929.  E. H. HENDRICKS  1,741,460
MOTOR
Filed April 12, 1927   3 Sheets-Sheet 3
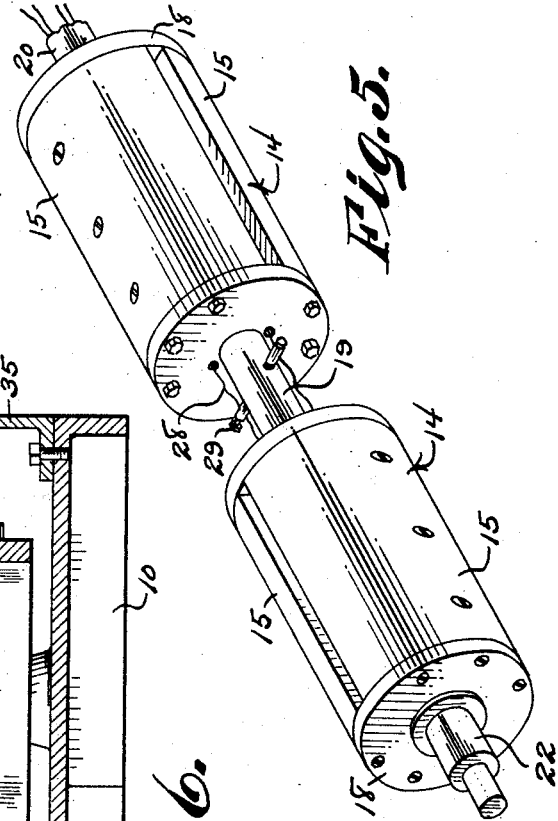
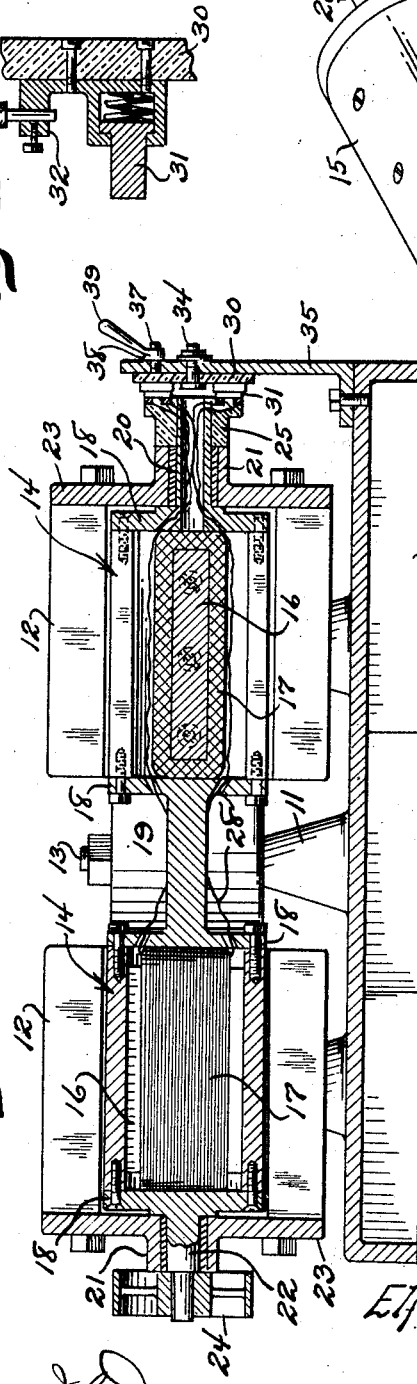
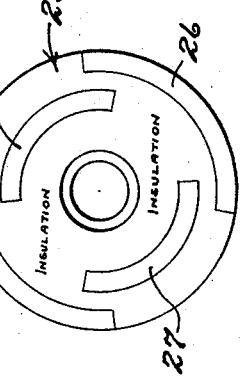
Elfonso Haynes Hendricks
INVENTOR
BY Victor J. Evans
ATTORNEY
WITNESS:

Patented Dec. 31, 1929

1,741,460

UNITED STATES PATENT OFFICE

ELFONSO H. HENDRICKS, OF LUBBOCK, TEXAS

MOTOR.

Application filed April 12, 1927. Serial No. 183,117.

This invention relates to improvements in electric motors and has for an object the provision of a motor which is constructed and arranged to provide a continuous cut of the lines of magnetic force of the field magnets and thus provide a continuous pull upon the armature.

To this end, the invention provides a multiple or sectional armature whose sections are arranged so that one section will be "advanced" far enough to be attracted by the field magnets of the motor to provide a forward pull, while another or lagging section, which is substantially one quarter turn behind, will reach a point just opposite its "natural" pole or attraction relative to the field magnets with its polarity reversed so that there is a repelling action, and the lagging armature section will be pushed away from this position. There is thus a pull by the attracted armature section and a push by the repelled section, with the pull and push of each section alternating, so that there is in effect a continuous impulse imparted to the armature.

Another object of the invention is the provision of a motor which includes permanent field magnets and an armature having electro magnets, the armature being of novel construction, and together with the field magnets provides a simple, reliable and efficient motor.

With the above and other objects in view, the invention further includes the following novel features and details of construction, to be hereinafter more fully described, illustrated in the accompanying drawings and pointed out in the appended claims.

In the drawings:—

Figure 2 is an elevation.

Figure 3 is a section on the line 3—3 of Figure 1.

Figure 4 is a similar view on the line 4—4 of Figure 1.

Figure 5 is a perspective view of the armature.

Figure 6 is an end view showing the arrangement of the distributor plates and commutator.

Figure 7 is an enlarged fragmentary section of the commutator brush.

Figure 1:
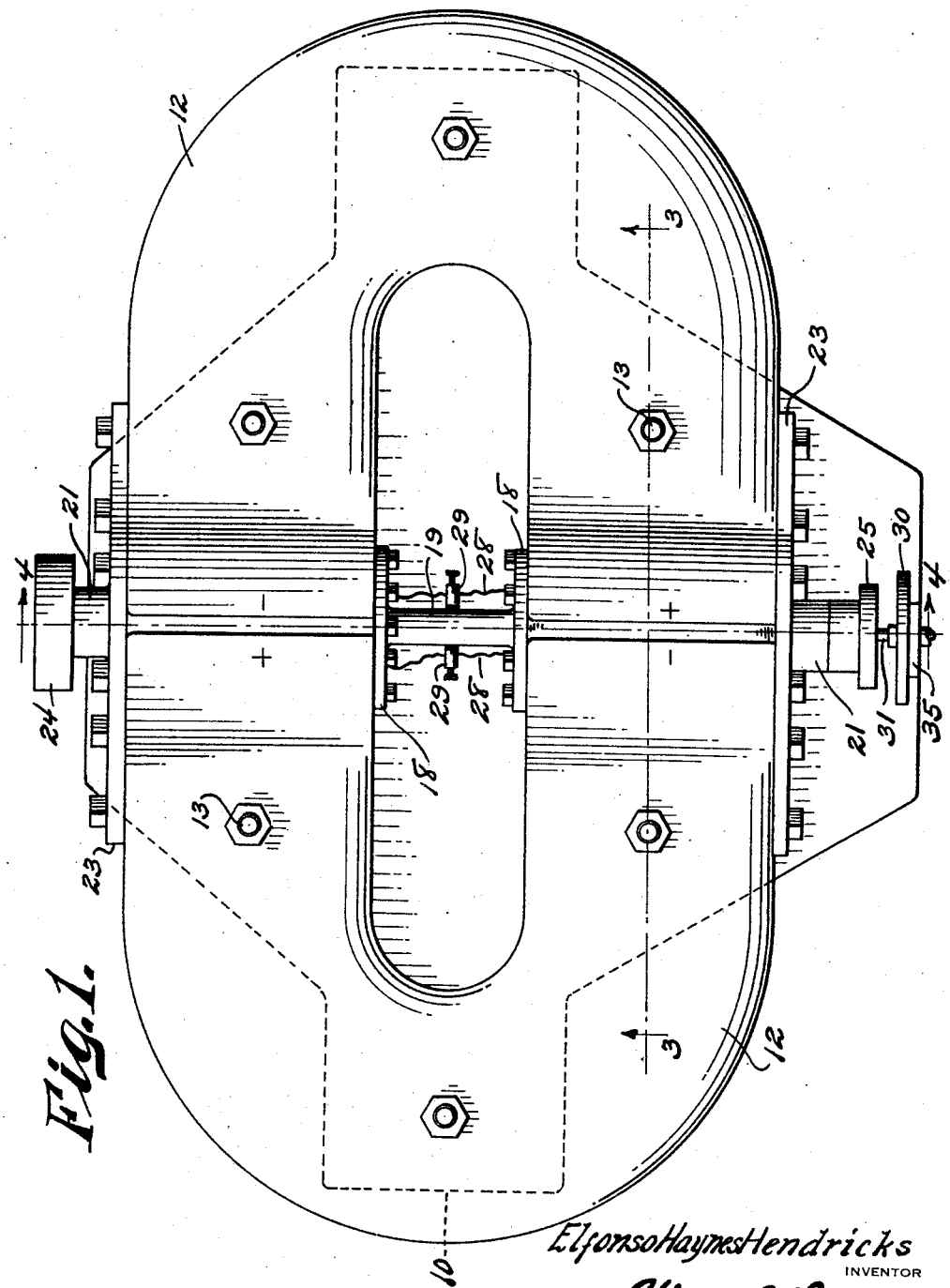
Figure 1 is a plan view of a motor constructed in accordance with the invention.

Referring to the drawings in detail wherein like characters of reference denote corresponding parts, the motor as shown comprises a base 10 which is constructed of non-magnetic material and which has rising therefrom legs 11 upon which are mounted the field magnets 12. These magnets are of the permanent horseshoe type and are secured to the legs by means of bolts 13. The magnets 12 are horizontally arranged as shown with opposite poles arranged in opposed relation, the south pole of one magnet being opposed to the north pole of the other magnet.

The armature which is shown in detail in Figure 5 of the drawings comprises separate sections 14. The sections are so arranged that one section is provided for operation between each pair of poles of the field magnets. While a single pair of field magnets is illustrated with an armature consisting of two sections, it is obvious that this construction may be duplicated as desired.

Each of the armature sections 14 comprises spaced substantially semi-circular pole pieces 15 which are attached to the opposite ends of a magnet core 16, the latter having a suitable inductance winding 17 thereon. A head 18 is attached to each end of each section, so that each section includes a hollow cylindrical member which encloses an electro magnet. The sections 14 are connected in spaced relation by a shaft 19, a hollow shaft 20 extending from one end of one of the armature sections for rotation in suitable bearings 21. The opposite or outer end of the other armature section 14 has extending therefrom a shaft 22 and this shaft also extends through a bearing 21. The bearings 21 are carried by plates 23 which connect and are supported by the field magnets 12. A pulley 24 is mounted upon the shaft 22.

Rotatable with the hollow shaft 20 is an insulating block 25 which carries arcuate contact plates 26 and 27. These plates provide commutator distributing plates, the plates 26 being connected to the inductance winding of one armature section while the plates 27 are connected to the inductance winding of the other armature section. For this purpose there are provided conductors 28 which are supported upon insulated posts 29 which extend radially from the shaft 19. Mounted upon an insulating base 20 is a spring pressed collector brush 31 which is illustrated in detail in Figure 7 of the drawings and this brush is in electrical connection with a binding post 32, for engagement by a conductor 33. The base 30 is pivotally secured as shown at 34 upon a standard 35 which rises from the base 10 and this standard has an arcuate slot 36 therein for the passage of a threaded pin 37 which extends from the base 30. Threadedly mounted upon the pin 37 is a binding nut 38 from which extends a handle 39, so that by manipulating the nut 38, the base 30 which carries the brush 31 may be rotatably adjusted for adjustably positioning the contact plates 26 and 27.

By reference to Figure 5 of the drawings it will be seen that the pole pieces 15 of one armature section are circumferentially offset with respect to the pole pieces of the other armature sections, the pole pieces of one armature section being arranged at substantially ninety degrees with respect to the other section. The pole pieces 15 are thus continually cutting the lines of force of the field magnets and as each armature section is alternately attracted and repelled and a pull and push action provided, it will be apparent that a continuous and steady impulse is exerted upon the armature. This acts to eliminate dead spots and to provide for a delivery of direct current. By reference to Figure 6 of the drawings, it will be seen that the plates 26 and 27 overlap one another and that the brush 31 engages one of the plates before leaving the other plate, so that there is a continuous engagement between the plates and brush commutator.

The invention is susceptible of various changes in its form, proportions and minor details of construction and the right is herein reserved to make such changes as properly fall within the scope of the appended claims.

Having described the invention what is claimed is:—

1. In an electric motor, a pair of magnets of the horse-shoe type arranged with their arms in end to end relation and with their opposite poles adjacent, an armature rotatably mounted between the poles and including two spaced sections each located between one pair of opposing poles of the magnets, each section of the armature including a magnetic core, a winding thereon and substantially semi-cylindrical pole-pieces, the pole-pieces of one section being arranged at a ninety degree angularity with respect to those of the other section, the pole-pieces of one of the sections being advanced and those of the other retarded with respect to the coacting pole-pieces of the magnets whereby the armature pole-pieces of certain polarity will be attracted simultaneously with repulsion of pole-pieces of the opposite polarity for producing the effect of a continuous impulse upon the armature.

2. In an electric motor, a pair of magnets of the horse-shoe type arranged with their arms in end to end relation and with their opposite poles adjacent, an armature rotatably mounted between the poles and including two spaced sections each located between one pair of opposing poles of the magnets, each section of the armature including a magnetic core, a winding thereon and substantially semi-cylindrical pole-pieces, the pole-pieces of one section being arranged at a ninety degree angularity with respect to those of the other section, the pole-pieces of one section being advanced and those of the other retarded with respect to the coacting pole-pieces of the magnets whereby the armature pole-pieces of one section will be attracted simultaneously with repulsion of the pole-pieces of the other section for producing the effect of a continuous impulse upon the armature, a member of insulating material carried by one end of the armature and rotatable therewith, concentric spaced arcuate contacts carried by said insulating member and connected with the respective terminals of the windings on the armature sections, and stationary contact brushes coacting with said contacts.

In testimony whereof I affix my signature.

ELFONSO H. HENDRICKS.